(No Model.)

S. A. BISHOP.
SCREEN FOR BIRD CAGES.

No. 339,366. Patented Apr. 6, 1886.

WITNESSES:
Fred. G. Dieterich
John C. Kemon

INVENTOR:
Samuel A. Bishop
BY Munn & Co
ATTORNEYS.

N. PETERS. Photo-Lithographer, Washington, D. C.

UNITED STATES PATENT OFFICE.

SAMUEL ADELBERT BISHOP, OF SMETHPORT, PENNSYLVANIA.

SCREEN FOR BIRD-CAGES.

SPECIFICATION forming part of Letters Patent No. 339,366, dated April 6, 1886.

Application filed August 18, 1885. Serial No. 174,745. (No model.)

*To all whom it may concern:*

Be it known that I, SAMUEL ADELBERT BISHOP, a citizen of the United States, residing at Smethport, in the county of McKean and State of Pennsylvania, have invented a new and useful Improvement in Screens for Bird-Cages, of which the following is a description.

It is a familiar fact that birds when kept in cages frequently scatter the hulls of the seeds on which they feed, making litter, and that in bathing they flutter the water about, to the damage of the wall or adjacent furniture.

The object of this invention is to prevent the above-named objectionable results.

To this end the invention consists in the construction and combination of parts forming a screen for bird-cages, hereinafter described and claimed, reference being had to the accompanying drawings, in which—

Figure 1:
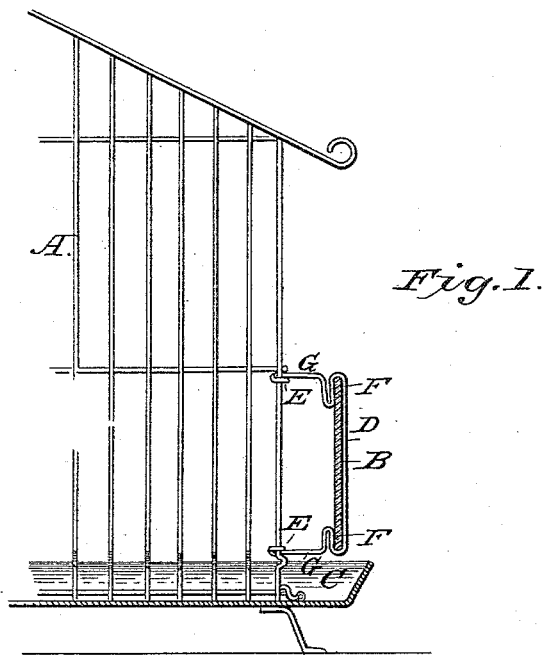
Figure 2:
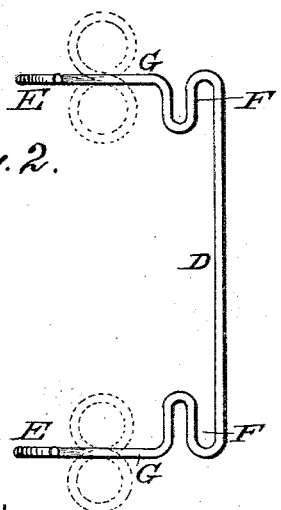
Figure 3:
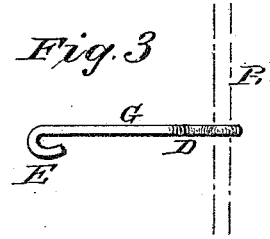

Figure 1 is an elevation of a portion of a bird-cage, showing my screen attached thereto. Fig. 2 is an elevation, and Fig. 3 is a plan view of the screen-holder.

A represents a portion of a bird-cage.

B is the screen, which I prefer to make of glass, in order that the bird may have an unobstructed view; but any sheet material which is stiff enough to maintain itself in form—such as tin, pasteboard, &c.—would answer the purpose.

I design holding this screen outside of the cage and near enough to the wires thereof to be over the projecting portion C of the cage-pan, whereby any seeds, water, &c., which the bird may throw against the said screen will be dropped into the pan.

To hold this screen I have devised a supporter, D, made of a single wire bent at its two ends into hooks E E, to engage any vertical wire of the cage, and further bent at equal distances from each end to form seats F F, to receive the screen B. The screen may be wide enough to fit a little closely in these seats, so as to be sufficiently firmly held by one supporter; or more than one supporter may be used. The arms G of the support may be of any form between the hooks E and seats F to suit the fancy, one modification being shown in dotted lines, Fig. 2.

One of these screens may be placed opposite the seed-cup, another opposite the bath-tub, &c.

What I claim as my invention, and desire to secure by Letters Patent, is—

1. A screen for bird-cages, consisting of a plate or board and a support having seats to receive and hold said plate or board, and provided with hooks for securing it to a bird-cage, as set forth.

2. The screen-support D, consisting of a single wire bent to form hooks E at its ends, and two opposite seats, F, at equal distances from said ends, substantially as shown and described.

SAMUEL ADELBERT BISHOP.

Witnesses:
BYRON D. HAMLIN,
JOHN FORREST.